US012350801B2

(12) United States Patent
Riley

(10) Patent No.: US 12,350,801 B2
(45) Date of Patent: Jul. 8, 2025

(54) SLIDE HAMMER ASSEMBLY

(71) Applicant: Van Riley, Pecos, TX (US)

(72) Inventor: Van Riley, Pecos, TX (US)

( * ) Notice: Subject to any disclaimer, the term of this patent is extended or adjusted under 35 U.S.C. 154(b) by 408 days.

(21) Appl. No.: 18/071,330

(22) Filed: Nov. 29, 2022

(65) Prior Publication Data

US 2024/0173837 A1 May 30, 2024

(51) Int. Cl.
*B66F 15/00* (2006.01)
*B25D 1/16* (2006.01)
*E04H 12/22* (2006.01)

(52) U.S. Cl.
CPC ............ *B25D 1/16* (2013.01); *E04H 12/2215* (2013.01)

(58) Field of Classification Search
CPC .. B66F 15/00; B25D 1/00; B25D 1/14; B25D 1/16; B25D 5/00; A45B 23/00
See application file for complete search history.

(56) References Cited

U.S. PATENT DOCUMENTS

| | | | |
|---|---|---|---|
| 3,823,785 | A | 7/1974 | Toliver |
| 4,104,088 | A | 7/1978 | Stauth |
| 6,964,277 | B2 | 11/2005 | Naber |
| 2006/0241647 | A1 | 10/2006 | Chen |
| 2011/0253876 | A1 | 10/2011 | Odell |

FOREIGN PATENT DOCUMENTS

| | | |
|---|---|---|
| WO | WO0162117 | 8/2001 |

*Primary Examiner* — Lee D Wilson

(57) ABSTRACT

A slide hammer assembly for driving a stake into ground without a hand held hammer includes a stake that has a tapered end to facilitate the tapered end to penetrate ground. A lower pipe has a receiver that is distally positioned with respect to a striking head and the receiver insertably receives the stake. An upper pipe is concentrically disposed on the lower pipe such that the upper pipe is slidable upwardly and downwardly along the lower pipe. The upper pipe has a hammering head which strikes the striking head on the lower pipe when the upper pipe is urged downwardly on the lower pipe thereby facilitating the stake to be driven into the ground.

8 Claims, 5 Drawing Sheets

SLIDE HAMMER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hammer devices and more particularly pertains to a new hammer device for driving a stake into ground without a hand held hammer. The device includes a lower pipe that has a receiver for insertably receiving a stake and a striking head disposed on the lower pipe. The device includes an upper pipe concentrically disposed on the lower pipe and a hammering head disposed on the upper pipe. The hammering head strikes the striking head when the upper pipe is slid downwardly on the lower pipe. The device includes a storage cup that is disposed on the upper pipe.

(2) Description of Related Art Including Information Disclosed Under 37 CFR 1.97 and 1.98

The prior art relates to hammer devices including a self driving anchor that includes a driving pin that is slidably disposed within the anchor. The prior art discloses a manual impact device that includes a stake, a sleeve slidably disposed on the stake and a spring positioned around the stake. The prior art discloses a hammering rod that includes a tube, a rod slidably inserted into the tube, a stake inserted into the tube and a handle that slidably engages the tube for hammering the rod into the stake. The prior art discloses a stake hammering device that includes a stake, a slide hammer slidably disposed on the stake and a receiver integrated into the slide hammer for receiving a pole when the stake is driven into ground.

BRIEF SUMMARY OF THE INVENTION

An embodiment of the disclosure meets the needs presented above by generally comprising a stake that has a tapered end to facilitate the tapered end to penetrate ground. A lower pipe has a receiver that is distally positioned with respect to a striking head and the receiver insertably receives the stake. An upper pipe is concentrically disposed on the lower pipe such that the upper pipe is slidable upwardly and downwardly along the lower pipe. The upper pipe has a hammering head which strikes the striking head on the lower pipe when the upper pipe is urged downwardly on the lower pipe thereby facilitating the stake to be driven into the ground.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
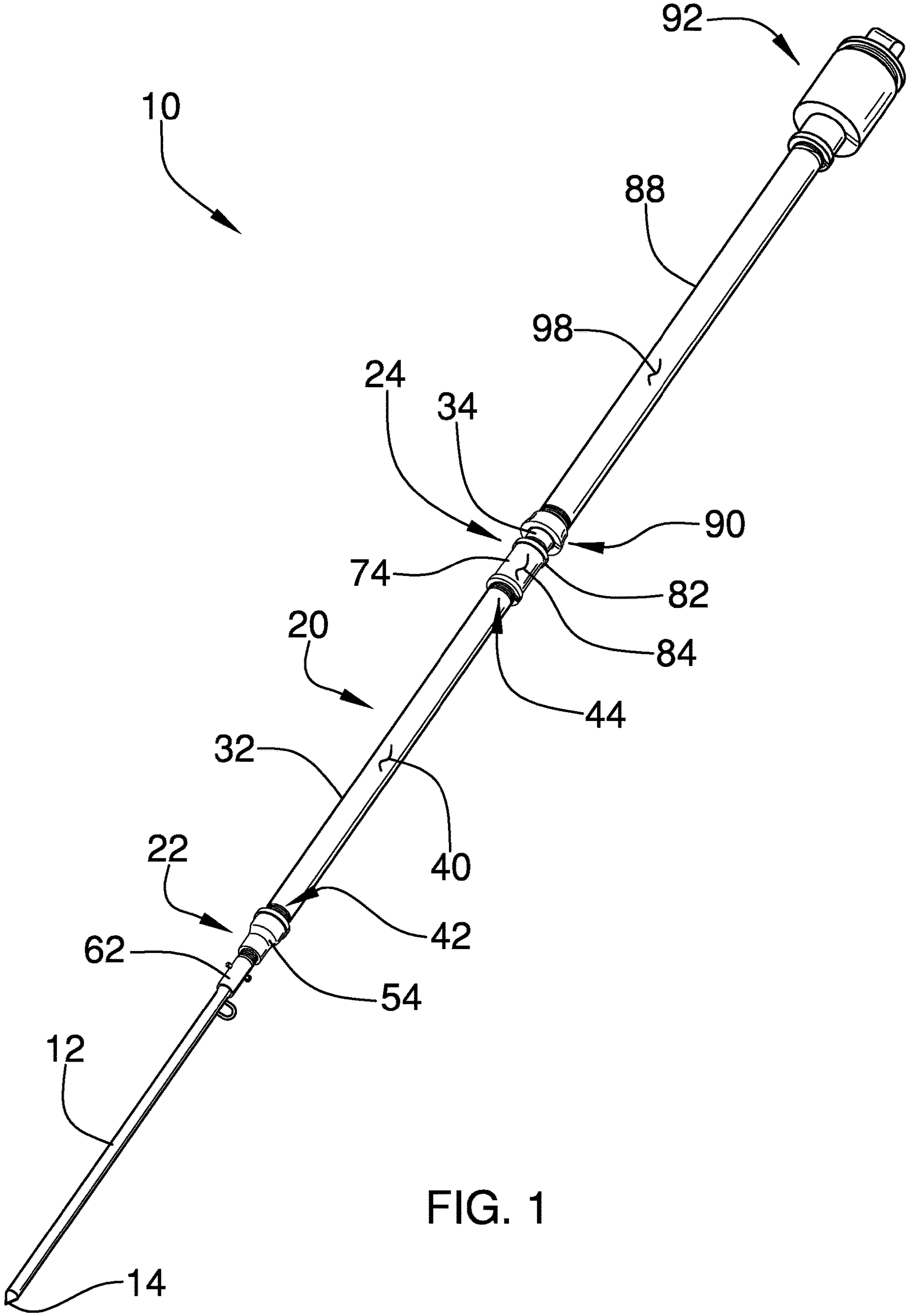
FIG. 1 is a perspective view of a slide hammer assembly according to an embodiment of the disclosure.
Figure 2:
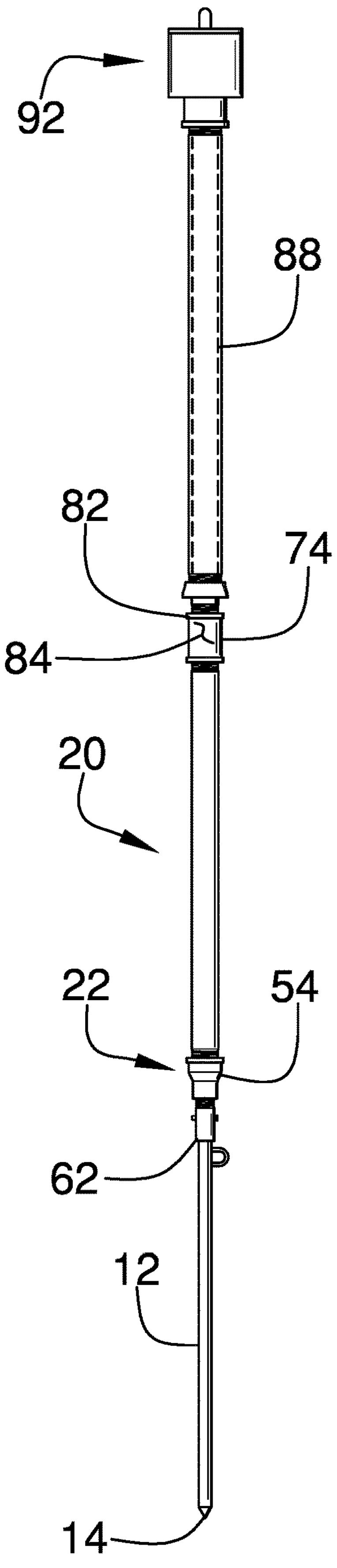
FIG. 2 is a front view of an embodiment of the disclosure.
Figure 3:
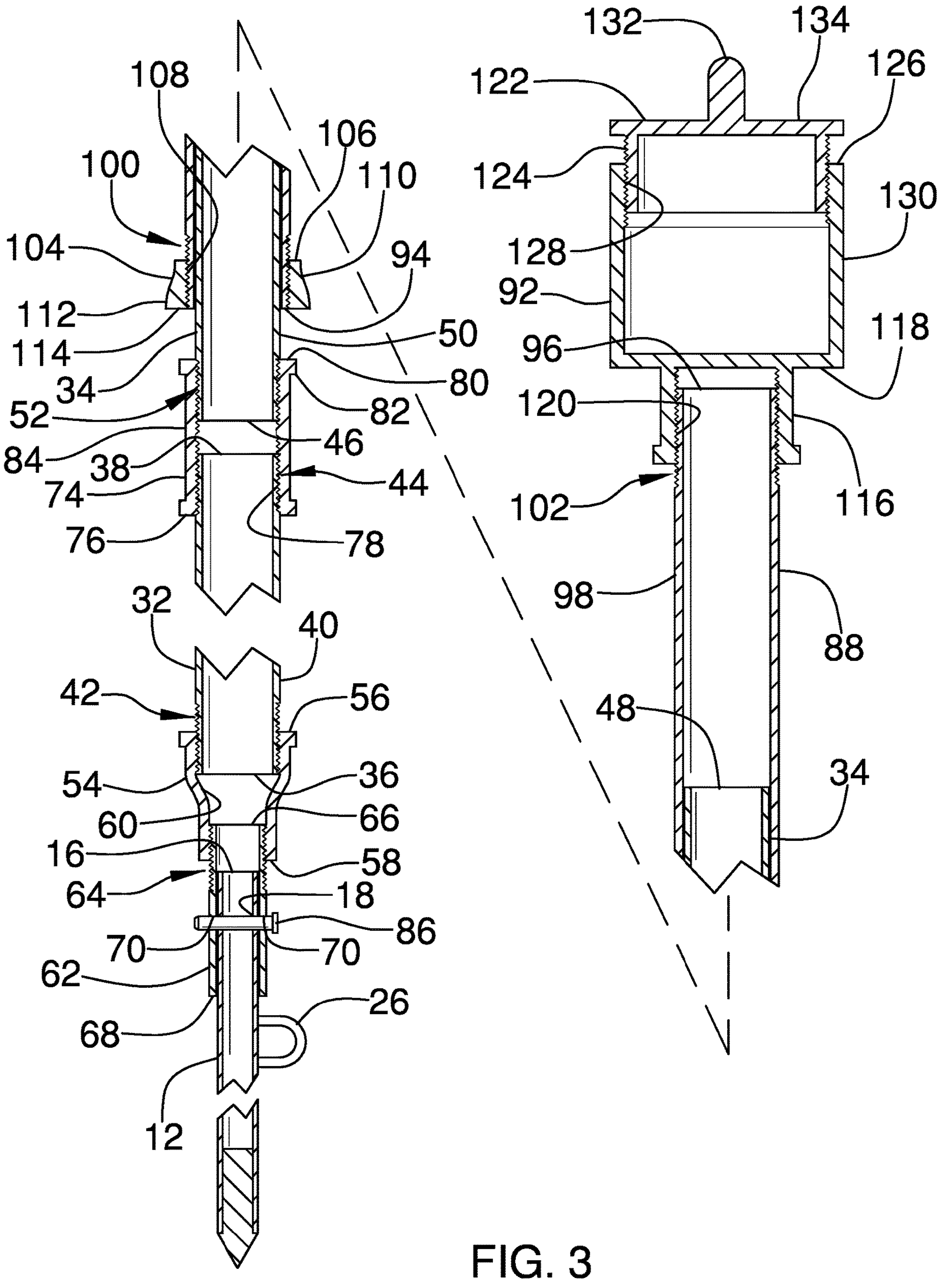
FIG. 3 is a front cut-away view of an embodiment of the disclosure.
Figure 4:
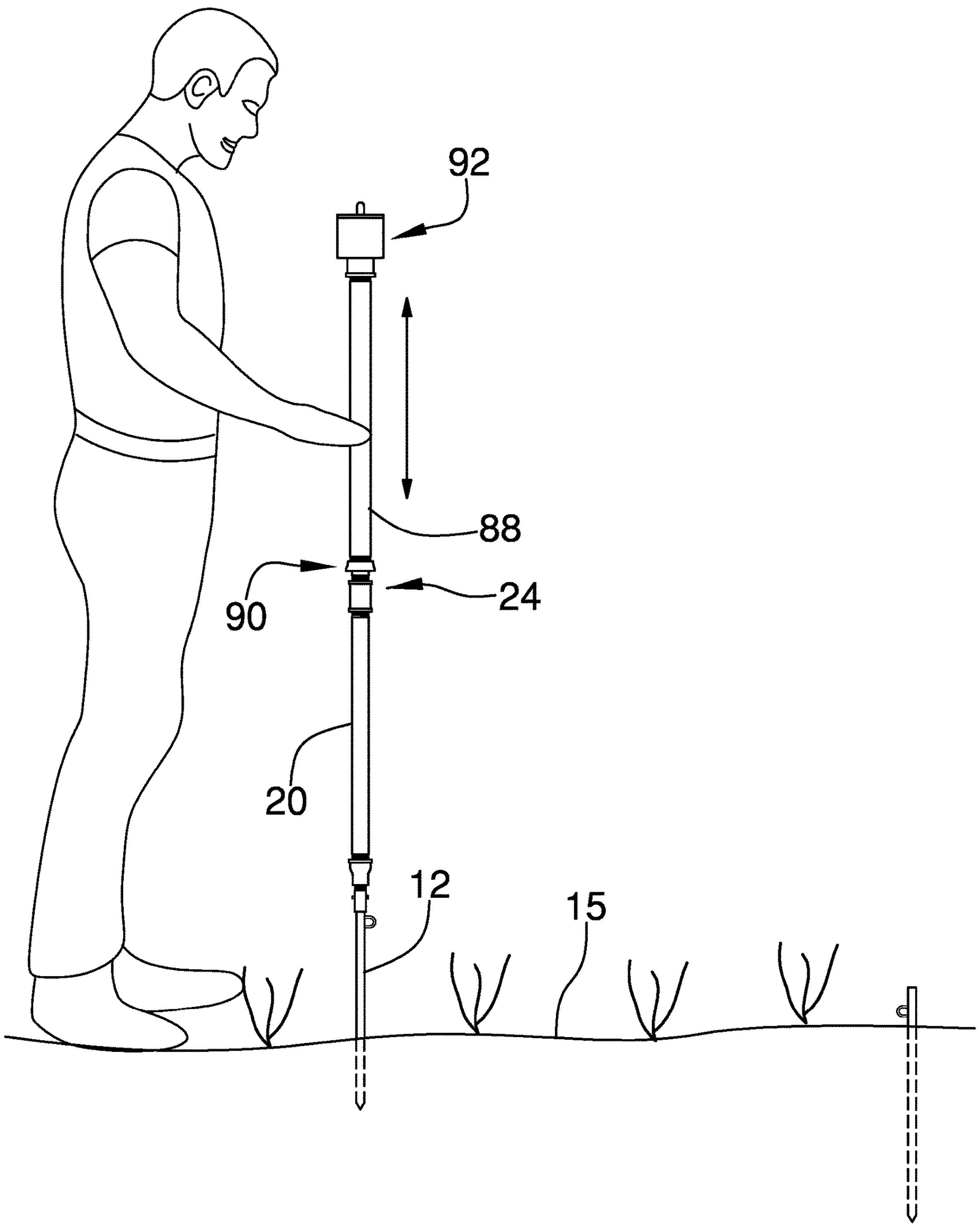
FIG. 4 is a perspective in-use view of an embodiment of the disclosure.
Figure 5:
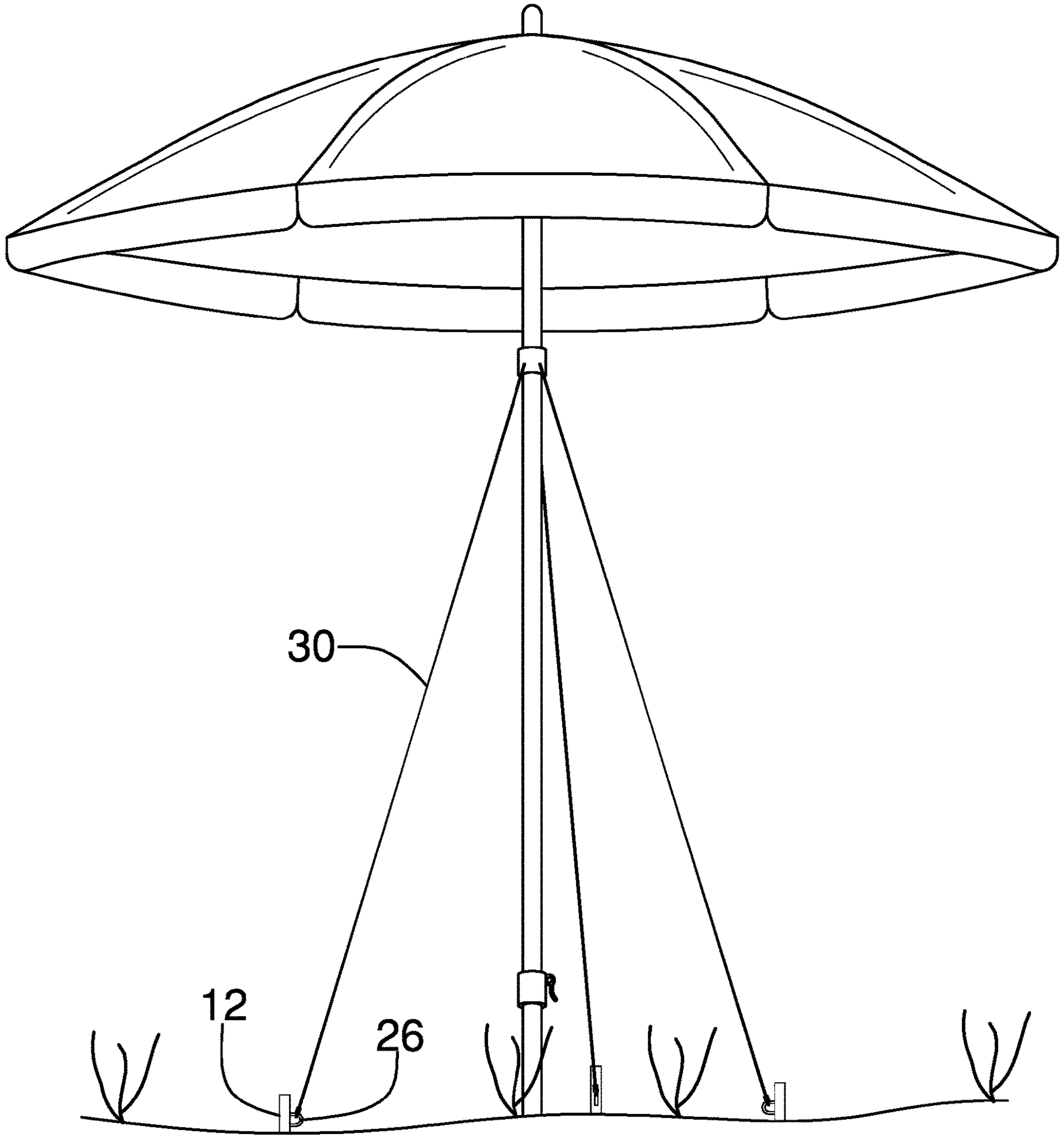
FIG. 5 is a perspective in-use view of an embodiment of the disclosure showing an umbrella being secured with a plurality of stakes.

With reference now to the drawings, and in particular to FIGS. 1 through 5 thereof, a new hammer device embodying the principles and concepts of an embodiment of the disclosure and generally designated by the reference numeral 10 will be described.

As best illustrated in FIGS. 1 through 5, the slide hammer assembly 10 generally comprises a stake 12 that has a tapered end 14 to facilitate the tapered end 14 to penetrate ground 15 and the stake 12 has a distal end 16 with respect to the tapered end 14. The stake 12 has a pin hole 18 extending laterally through the stake 12 and the pin hole 18 is positioned proximate the distal end 16. A lower pipe 20 is provided which has a receiver 22 that is distally positioned with respect to a striking head 24. The receiver 22 insertably receives the stake 12 such that the stake 12 is oriented collinear with the lower pipe 20. A loop 26 is attached to an outer surface 28 of the stake 12 and the loop 26 is positioned adjacent to the distal end 16 of the stake 12 to facilitate a guy wire 30, or other type of securing line, to be attached to the loop 26 once the stake 12 has been driven into the ground 15.

The lower pipe 20 comprises a bottom section 32 and a top section 34 and the bottom section 32 has a bottom end 36 and a top end 38. An outer surface 40 of the bottom section 32 has bottom threads 42 located adjacent to the bottom end 36 and the outer surface 40 of the bottom section 32 has top threads 44 located adjacent to the top end 38. The top section 34 of the lower pipe 20 has a lower end 46 and an upper end 48 and an outside surface 50 of the top section 34 has lower threads 52 located adjacent to the lower end 46. The receiver 22 includes a reducer 54 that has a top end 56 and a bottom end 58; the reducer 54 is substantially hollow and each of the top end 56 and the bottom end 58 of the reducer 54 is open. The top end 56 of the reducer 54 has a diameter that is greater than a diameter of the bottom end 58 of the reducer 54. Additionally, the top end 56 of the reducer 54 insertably receives the bottom end 36 of the bottom section 32 having an interior surface 60 of the reducer 54 threadably engaging the bottom threads 42. Each of the top section 34 and the bottom section 32 may have a length of at least 0.5 meters and each of the top section 34 and the bottom section 32 are comprised of a rigid material, including but not being limited to, steel or iron.

The receiver 22 includes a stake sleeve 62 that has stake sleeve threads 64 located adjacent to a topmost end 66 of the stake sleeve 62. The bottom end 58 of the reducer 54 insertably receives the topmost end 66 of the stake sleeve 62 such that the stake sleeve threads 64 threadably engage the interior surface 60 of the reducer 54. A bottommost end 68 of the stake sleeve 62 insertably receives the distal end 16 of the stake 12. The stake sleeve 62 has a pair of pin holes 70 each extending through an outer wall 72 of the stake sleeve 62. Each of the pin holes 70 in the outer wall 72 of the stake sleeve 62 is aligned with the pin hole 18 in the stake 12 when the distal end 16 of the stake 12 is inserted into the bottommost end 68 of the stake sleeve 62.

The lower pipe 20 includes a coupling sleeve 74 and a lower end 76 of the coupling sleeve 74 insertably receives the top end 38 of the bottom section 32 of the lower pipe 20. An inside surface 78 of the coupling sleeve 74 threadably engages the top threads 44 on the outer surface 40 of the bottom section 32. An upper end 80 of the coupling sleeve 74 insertably receives the lower end 46 of the top section 34 of the lower pipe 20 having the inside surface 78 of the coupling sleeve 74 threadably engaging the lower threads 52 on the outside surface 50 of the top section 34. The coupling sleeve 74 has a prominence 82 extending around a full circumference of an exterior surface 84 of the coupling sleeve 74 such that the prominence 82 defines the striking head 24. Additionally, the prominence 82 is aligned with the upper end 80 of the coupling sleeve 74. A pin 86 is extendable through the receiver 22 and the stake 12 when the stake 12 is inserted into the receiver 22 for retaining the stake 12 in the receiver 22. The pin 86 extends through each of the pin holes 70 in the outer wall 72 of the stake sleeve 62 and the pin hole 18 in the stake 12.

An upper pipe 88 is concentrically disposed on the lower pipe 20 such that the upper pipe 88 is slidable upwardly and downwardly along the lower pipe 20. The upper pipe 88 has a hammering head 90 that is distally positioned with respect to a storage cup 92 and the pin 86 is stored in the storage cup 92 when the pin 86 is not in use. The hammering head 90 strikes the striking head 24 on the lower pipe 20 when the upper pipe 88 is urged downwardly on the lower pipe 20 thereby facilitating the stake 12 to be driven into the ground 15. The upper pipe 88 has a bottom end 94 and a top end 96 and the bottom end 94 of the upper pipe 88 slidably receives the upper end 48 of the top section 34 of the lower pipe 20. An outside surface 98 of the upper pipe 88 has bottom threads 100 located adjacent to the bottom end 94 of the upper pipe 88 and the outside surface 98 of the upper pipe 88 has top threads 102 located adjacent to the top end 96 of the upper pipe 88. The upper pipe 88 has a length of at least 0.5 meters and the upper pipe 88 is comprised of a rigid material, including but not being limited to, steel or iron.

The upper pipe 88 includes a striking sleeve 104 and a top end 106 of the striking sleeve 104 insertably receives the bottom end 94 of the upper pipe 88. An interior surface 108 of the striking sleeve 104 threadably engages the bottom threads 42 on the outside surface 98 of the upper pipe 88. An exterior surface 110 of the striking sleeve 104 has a prominence 112 extending around a full circumference of the exterior surface 110 of the striking sleeve 104 such that the prominence 112 associated with the striking sleeve 104 defines the hammering head 90. The prominence 112 associated with the striking sleeve 104 is aligned with a bottom end 114 of the striking sleeve 104. Furthermore, the prominence 112 associated with the striking sleeve 104 strikes the prominence 82 associated with the coupling sleeve 74 when the upper pipe 88 is slid downwardly on the top section 34 of the lower pipe 20. Each of the striking sleeve 104 and the coupling sleeve 74 are comprised of a resilient material, including but not being limited to, steel or iron thereby facilitating the striking sleeve 104 and the coupling sleeve 74 to resist being deformed as a result of striking each other.

The storage cup 92 has a coupler 116 that is attached to a bottom wall 118 of the storage cup 92. The coupler 116 insertably receives the top end 96 of the upper pipe 88 having an inside surface 120 of the coupler 116 threadably engaging the top threads 44 on the outside surface 98 of the upper pipe 88. A cap 122 is provided that has an exterior wall 124 which is threaded. An upper end 126 of the storage cup 92 insertably receives the exterior wall 124 having the exterior wall 124 threadably engaging an interior surface 128 of an outside wall 130 of the storage cup 92 for attaching the cap 122 to the storage cup 92. Additionally, the cap 122 has a knob 132 extending upwardly from a top wall 134 of the cap 122 thereby facilitating the knob 132 to be gripped.

In use, the stake 12 is inserted into the stake sleeve 62 and the pin 86 is extended through the stake sleeve 62 and the stake 12 for retaining the stake 12 in the stake sleeve 62. The tapered end 14 of the stake 12 is positioned at a desired location on the ground 15 and the upper pipe 88 is repeatedly driven downwardly on the lower pipe 20 to facilitate the prominence 112 on the striking sleeve 104 to strike the prominence 82 on the coupling sleeve 74. In this way the striking force of the striking sleeve 104 is transferred into the stake 12 to facilitate the stake 12 to be driven into the ground 15. The pin 86 is removed from the stake sleeve 62 and the stake 12 and the pin 86 is placed in the storage cup 92 for storage once the stake 12 has been driven into the ground 15.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A slide hammer assembly for driving a stake into the ground, said assembly comprising:

a stake having a tapered end to facilitate said tapered end to penetrate ground;

a lower pipe having a receiver being distally positioned with respect to a striking head, said receiver insertably receiving said stake such that said stake is oriented collinear with said lower pipe;

a pin being extendable through said receiver and said stake when said stake is inserted into said receiver for retaining said stake in said receiver; and an upper pipe being concentrically disposed on said lower pipe such that said upper pipe is slidable upwardly and downwardly along said lower pipe, said upper pipe having a hammering head being distally positioned with respect to a storage cup, said pin being stored in said storage cup when said pin is not in use, said hammering head striking said striking head on said lower pipe when said upper pipe is urged downwardly on said lower pipe thereby facilitating said stake to be driven into the ground.

2. The assembly according to claim 1, wherein:

said lower pipe comprises a bottom section and a top section;

wherein said bottom section has a bottom end and a top end, an outer surface of said bottom section having bottom threads located adjacent to said bottom end, said outer surface of said bottom section having top threads located adjacent to said top end;

wherein said top section has a lower end and an upper end, an outside surface of said top section having lower threads located adjacent to said lower end; and wherein said receiver includes a reducer having a top end and a bottom end, said reducer being substantially hollow, each of said top end and said bottom end of said reducer being open, said top end of said reducer having a diameter being greater than a diameter of said bottom end of said reducer, said top end of said reducer insertably receiving said bottom end of said bottom section having an interior surface of said reducer threadably engaging said bottom threads.

3. The assembly according to claim 2, wherein:

said receiver includes a stake sleeve having stake sleeve threads located adjacent to a topmost end of said stake sleeve, said bottom end of said reducer insertably receiving said topmost end of said stake sleeve such that said stake sleeve threads threadably engage said interior surface of said reducer, a bottommost end of said stake sleeve insertably receiving said distal end of said stake, said stake sleeve having a pair of pin holes each extending through an outer wall of said stake sleeve, each of said pin holes in said outer wall of said stake sleeve being aligned with said pin hole in said stake when said distal end of said stake is inserted into said bottommost end of said stake sleeve;

said stake has a distal end with respect to said tapered end, said stake having a pin hole extending laterally through said stake, said pin hole being positioned proximate said distal end; and said pin extends through each of said pin holes in said outer wall of said stake sleeve and said pin hole in said stake.

4. The assembly according to claim 2, wherein:

said lower pipe includes a coupling sleeve, a lower end of said coupling sleeve insertably receiving said top end of said bottom section of said lower pipe having an inside surface of said coupling sleeve threadably engaging said top threads on said outer surface of said bottom section, an upper end of said coupling sleeve insertably receiving said lower end of said top section of said lower pipe having said inside surface of said coupling sleeve threadably engaging said lower threads on said outside surface of said top section; and said coupling sleeve has a prominence extending around a full circumference of an exterior surface of said coupling sleeve such that said prominence defines said striking head, said prominence being aligned with said upper end of said coupling sleeve.

5. The assembly according to claim 2, wherein said upper pipe has a bottom end and a top end, said bottom end of said upper pipe slidably receiving said upper end of said top section of said lower pipe, an outside surface of said upper pipe having bottom threads located adjacent to said bottom end of said upper pipe, said outside surface of said upper pipe having top threads located adjacent to said top end of said upper pipe.

6. The assembly according to claim 5, wherein:

said lower pipe includes a coupling sleeve, said coupling sleeve having a prominence extending around a full circumference of an exterior surface of said coupling sleeve such that said prominence defines said striking head;

said upper pipe includes a striking sleeve, a top end of said striking sleeve insertably receiving said bottom end of said upper pipe having an interior surface of said striking sleeve threadably engaging said bottom threads on said outside surface of said upper pipe; and an exterior surface of said striking sleeve has a prominence extending around a full circumference of said exterior surface of said striking sleeve such that said prominence associated with said striking sleeve defines said hammering head, said prominence associated with said striking sleeve being aligned with a bottom end of said striking sleeve, said prominence associated with said striking sleeve striking said prominence associated with said coupling sleeve when said upper pipe is slid downwardly on said top section of said lower pipe.

7. The assembly according to claim 5, wherein:

said storage cup has a coupler attached to a bottom wall of said storage cup, said coupler insertably receiving said top end of said upper pipe having an inside surface of said coupler threadably engaging said top threads on said outside surface of said upper pipe; and a cap having an exterior wall being threaded, an upper end of said storage cup insertably receiving said exterior wall having said exterior wall threadably engaging an interior surface of an outside wall of said storage cup for attaching said cap to said storage cup, said cap having a knob extending upwardly from a top wall of said cap thereby facilitating said knob to be gripped.

8. A slide hammer assembly for driving a stake into the ground, said assembly comprising:

a stake having a tapered end to facilitate said tapered end to penetrate ground, said stake having a distal end with respect to said tapered end, said stake having a pin hole extending laterally through said stake, said pin hole being positioned proximate said distal end;

a lower pipe having a receiver being distally positioned with respect to a striking head, said receiver insertably receiving said stake such that said stake is oriented collinear with said lower pipe;

wherein said lower pipe comprises a bottom section and a top section;

wherein said bottom section has a bottom end and a top end, an outer surface of said bottom section having bottom threads located adjacent to said bottom end, said outer surface of said bottom section having top threads located adjacent to said top end;

wherein said top section has a lower end and an upper end, an outside surface of said top section having lower threads located adjacent to said lower end;

wherein said receiver includes a reducer having a top end and a bottom end, said reducer being substantially hollow, each of said top end and said bottom end of said reducer being open, said top end of said reducer having a diameter being greater than a diameter of said bottom end of said reducer, said top end of said reducer insertably receiving said bottom end of said bottom section having an interior surface of said reducer threadably engaging said bottom threads;

wherein said receiver includes a stake sleeve having stake sleeve threads located adjacent to a topmost end of said stake sleeve, said bottom end of said reducer insertably receiving said topmost end of said stake sleeve such that said stake sleeve threads threadably engage said interior surface of said reducer, a bottommost end of said stake sleeve insertably receiving said distal end of said stake, said stake sleeve having a pair of pin holes each extending through an outer wall of said stake sleeve, each of said pin holes in said outer wall of said stake sleeve being aligned with said pin hole in said stake when said distal end of said stake is inserted into said bottommost end of said stake sleeve;

wherein said lower pipe includes a coupling sleeve, a lower end of said coupling sleeve insertably receiving said top end of said bottom section of said lower pipe having an inside surface of said coupling sleeve threadably engaging said top threads on said outer surface of said bottom section, an upper end of said coupling sleeve insertably receiving said lower end of said top section of said lower pipe having said inside surface of said coupling sleeve threadably engaging said lower threads on said outside surface of said top section, said coupling sleeve having a prominence extending around a full circumference of an exterior surface of said coupling sleeve such that said prominence defines said striking head, said prominence being aligned with said upper end of said coupling sleeve;

a pin being extendable through said receiver and said stake when said stake is inserted into said receiver for retaining said stake in said receiver, said pin extending through each of said pin holes in said outer wall of said stake sleeve and said pin hole in said stake;

an upper pipe being concentrically disposed on said lower pipe such that said upper pipe is slidable upwardly and downwardly along said lower pipe, said upper pipe having a hammering head being distally positioned with respect to a storage cup, said pin being stored in said storage cup when said pin is not in use, said hammering head striking said striking head on said lower pipe when said upper pipe is urged downwardly on said lower pipe thereby facilitating said stake to be driven into the ground, said upper pipe having a bottom end and a top end, said bottom end of said upper pipe slidably receiving said upper end of said top section of said lower pipe, an outside surface of said upper pipe having bottom threads located adjacent to said bottom end of said upper pipe, said outside surface of said upper pipe having top threads located adjacent to said top end of said upper pipe;

wherein said upper pipe includes a striking sleeve, a top end of said striking sleeve insertably receiving said bottom end of said upper pipe having an interior surface of said striking sleeve threadably engaging said bottom threads on said outside surface of said upper pipe, an exterior surface of said striking sleeve having a prominence extending around a full circumference of said exterior surface of said striking sleeve such that said prominence associated with said striking sleeve defines said hammering head, said prominence associated with said striking sleeve being aligned with a bottom end of said striking sleeve, said prominence associated with said striking sleeve striking said prominence associated with said coupling sleeve when said upper pipe is slid downwardly on said top section of said lower pipe;

wherein said storage cup has a coupler attached to a bottom wall of said storage cup, said coupler insertably receiving said top end of said upper pipe having an inside surface of said coupler threadably engaging said top threads on said outside surface of said upper pipe; and a cap having an exterior wall being threaded, an upper end of said storage cup insertably receiving said exterior wall having said exterior wall threadably engaging an interior surface of an outside wall of said storage cup for attaching said cap to said storage cup, said cap having a knob extending upwardly from a top wall of said cap thereby facilitating said knob to be gripped.

* * * * *